(12) United States Patent
Hamada et al.

(10) Patent No.: US 6,176,396 B1
(45) Date of Patent: Jan. 23, 2001

(54) FLUID SUBSTANCE DISPENSER

(75) Inventors: Masafumi Hamada, Fujioka; Toshiharu Takekawa, Tokyo, both of (JP)

(73) Assignee: Mitsubishi Pencil Kabushiki Kaisha, Tokyo (JP)

( * ) Notice: Under 35 U.S.C. 154(b), the term of this patent shall be extended for 0 days.

(21) Appl. No.: 09/349,023

(22) Filed: Jul. 7, 1999

(30) Foreign Application Priority Data

Aug. 27, 1998 (JP) ................................................. 10-241318

(51) Int. Cl.[7] .............................. B67D 5/52; G01F 11/42
(52) U.S. Cl. ........................... 222/137; 222/327; 222/390
(58) Field of Search ................................... 222/137, 327, 222/390

(56) References Cited

U.S. PATENT DOCUMENTS

| 4,144,988 |   | 3/1979  | Bergman . |        |
|-----------|---|---------|-----------|--------|
| 5,104,005 | * | 4/1992  | Schneider, Jr. et al. | 222/137 |
| 5,207,357 | * | 5/1993  | Aronie et al. | 222/137 |
| 5,249,709 | * | 10/1993 | Duckworth et al. | 222/137 |
| 5,441,175 | * | 8/1995  | Jacobsen et al. | 222/137 |

FOREIGN PATENT DOCUMENTS

| 58-91571  | 12/1981 | (JP) . |
| 60-148271 | 3/1984  | (JP) . |
| 60-161073 | 3/1984  | (JP) . |

* cited by examiner

Primary Examiner—Kevin Shaver
Assistant Examiner—David Deal
(74) Attorney, Agent, or Firm—Darby & Darby (57) ABSTRACT

A fluid substance dispenser, includes: a main casing having a multiple number of partitioned, fluid substance storage spaces, each having a piston having a female threaded hole and a piston moving mechanism fitted inside the fluid substance storage space; a forward actuation shaft having a male thread mating the female threaded hole; and a shaft rotating mechanism for turning the forward actuation shaft. This shaft rotating mechanism is configured of a single forward-actuating knob rotatably supported by the main casing and gears for transmitting the rotation of the forward-actuating knob to each forward actuation shaft.

9 Claims, 11 Drawing Sheets

FLUID SUBSTANCE DISPENSER

BACKGROUND OF THE INVENTION (1) Field of the Invention

The present invention relates to a fluid substance dispenser which allows for easy and correct supplying of fluid substances such as a cosmetic, liquid paint, liquid adhesive and the like.

(2) Description of the Prior Art

Paints consisting of fluid substances have the advantages of creating a uniform application and easy mixing of multiple substances but also suffer from difficulties in adjusting the amount of application and in storage and holding. For these reasons, dispensers that can both store and supply the paint or application material have been used.

Dispensers of this kind have been known conventionally and disclosed in, for example, Japanese Utility Model Application Laid-Open Sho 60 No.148271, Japanese Utility Model Application Laid-Open Sho 58 No.91571, Japanese Utility Model Application Laid-Open Sho 60, No.161073, and U.S. Pat. No. 4,144,988.

Figure 1:
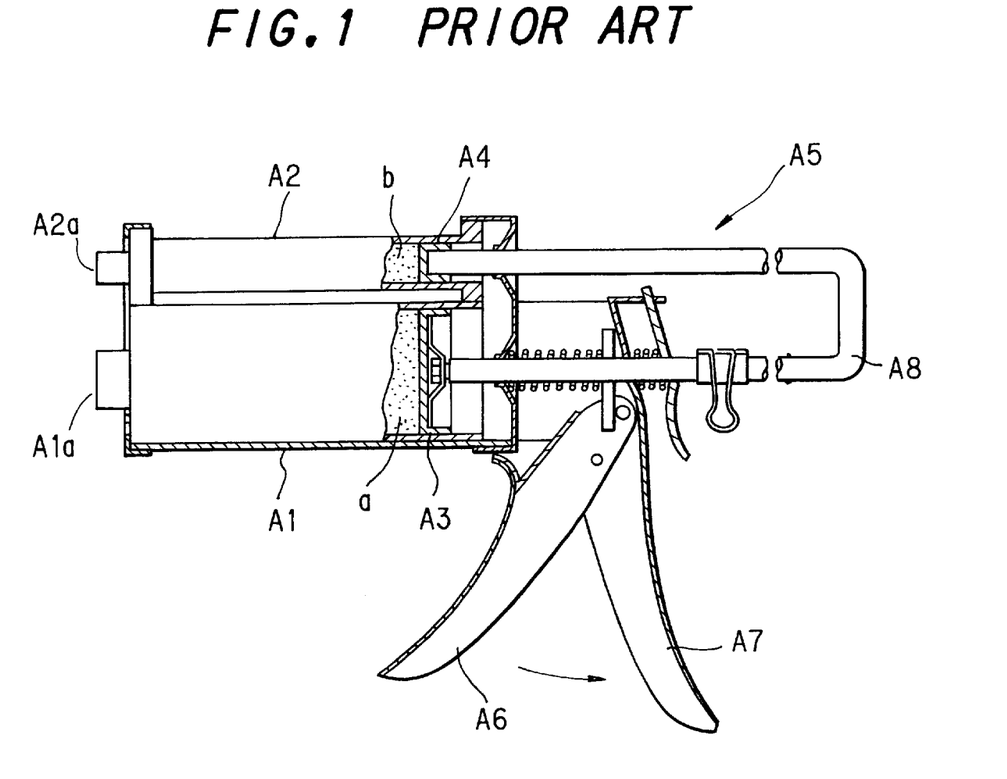
FIG. 1 is a partially cutout side view showing a first example of a conventional fluid substance dispenser.

Among these, Japanese Utility Model Application Laid-Open Sho 60 No.148271 discloses a configuration shown in FIG. 1, which includes: two containers A1 and A2, arranged side by side, containing different types of viscous liquids 'a' and 'b'; pistons A3 and A4 inserted in respective containers A1 and A2 for extruding the viscous liquids therein; and an extruding mechanism A5 for moving pistons A3 and A4 forwards. Extruding mechanism A5 is constructed such that a lever A6 is moved toward a handle A7 so as to move forward a U-shaped extruder rod A8. The two ends of rod A8 are abutted against the aforementioned pistons A3 and A4 and hence move the pistons forwards to thereby eject viscous liquids 'a' and 'b' stored in respective containers A1 and A2, from ejection opening A1a and A2a of containers A1 and A2.

Figure 2:
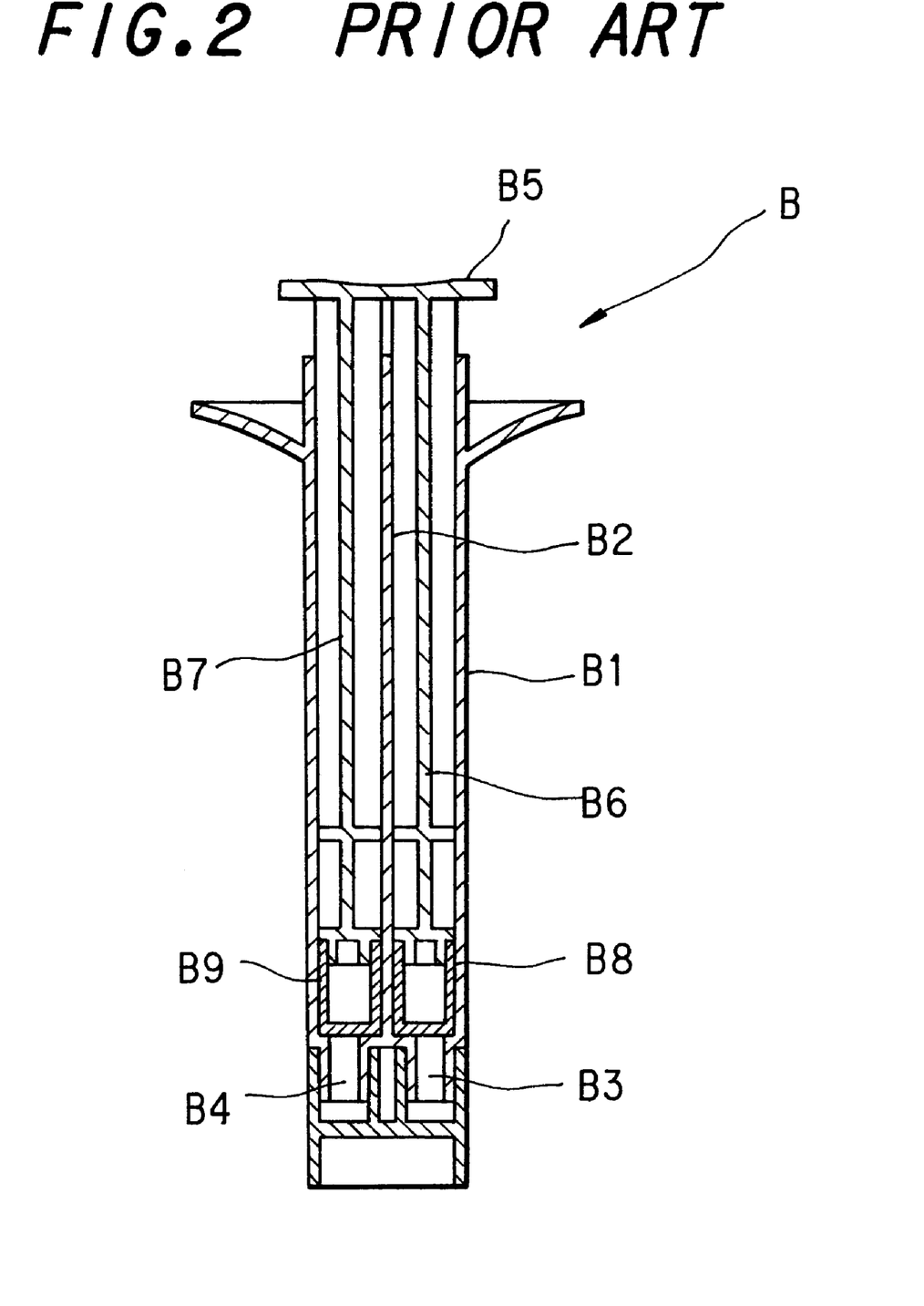
FIG. 2 is a longitudinal sectional side view showing a second example of a conventional fluid substance dispenser.

The configuration shown in Japanese Utility Model Application Laid-Open Sho 58 No.91571, as shown in FIG. 2, includes: a container B1 having a partition wall B2 therein forming two chambers B3 and B4; and pressing rods B6 and B7 attached to a thumb rest B5 and having piston heads B8 and B9 at the front end thereof, wherein piston heads B8 and B9 are fitted in respective chambers B3 and B4. In this configuration, as thumb rest B5 is thrust forwards, piston heads B8 and B9 move forwards together with pressing rods B6 and B7, to thereby eject the two types of liquids previously stored in chambers B3 and B4 out from the front openings of chambers B3 and B4.

Figure 3:
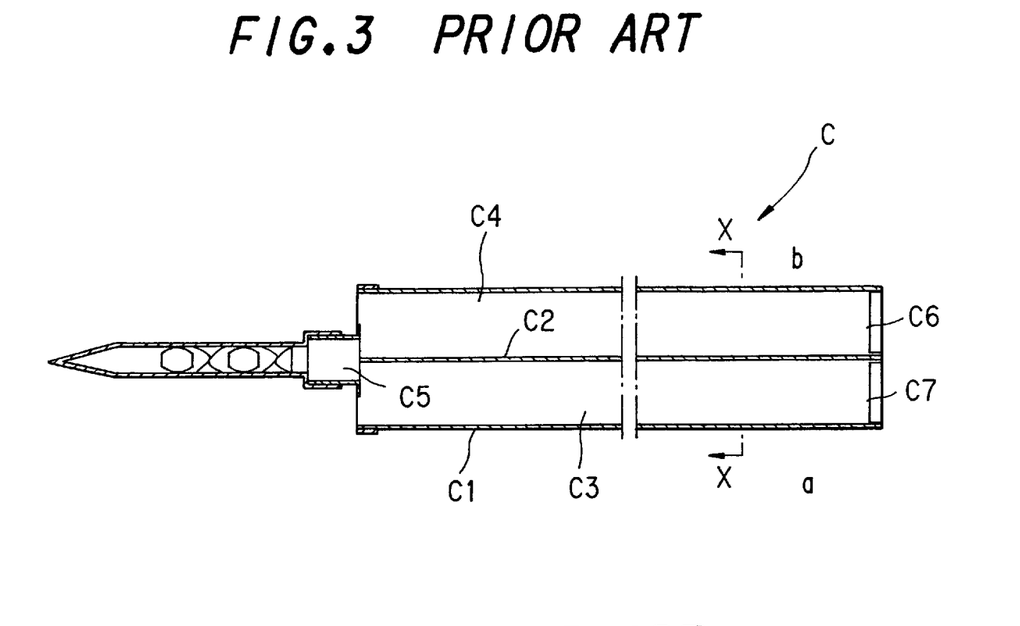
FIG. 3 is a longitudinal sectional side view showing a third example of a conventional fluid substance dispenser.
Figure 4:
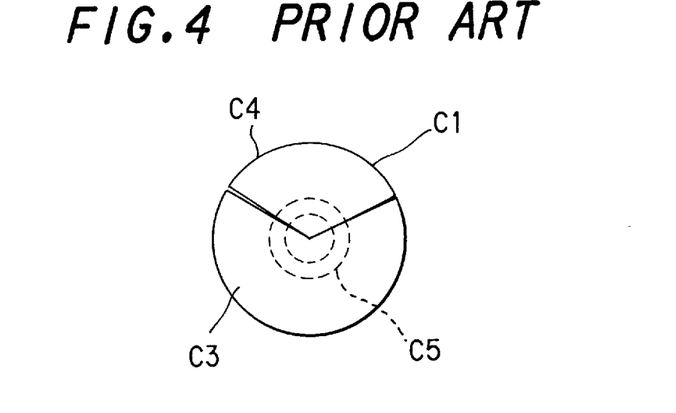
FIG. 4 is a sectional view cut along a line X—X.

The configuration shown in Japanese Utility Model Application Laid-Open Sho 60 No.161073, as shown in FIGS. 3 and 4, includes: a cylindrical barrel C1 partitioned by partitioning element C2 forming two storage spaces C3 and C4; an ejection opening C5 communicating with storage spaces C3 and C4 at their one end with uneven cross-sectional area ratio; pressing elements C6 and C7 positioned at the other end of storage spaces C3 and C4, so that the movement of the pressingelements causes fluidcomponents 'a' and 'b' filling respective storage spaces C3 and C4 to flow out from ejection opening C5 in a prescribed ratio.

Figure 5:
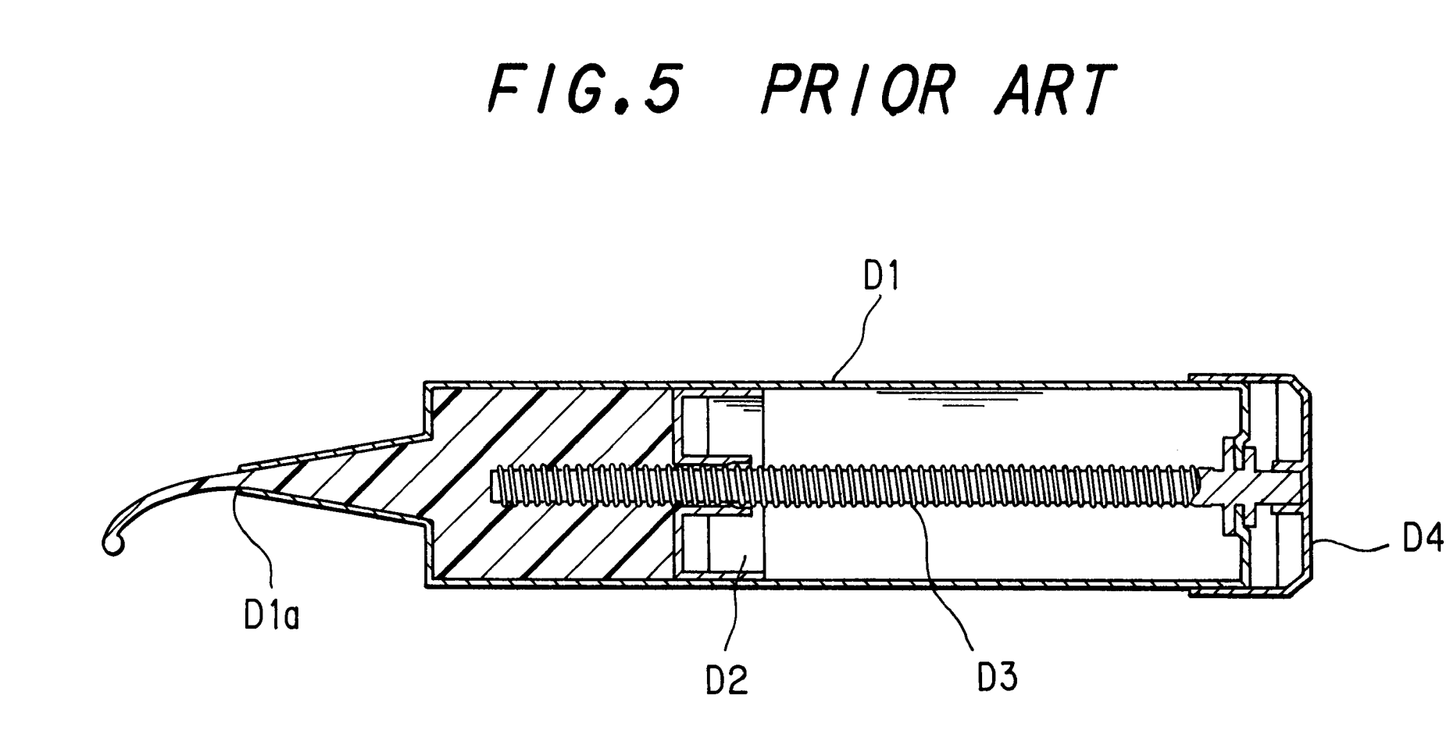
FIG. 5 is a longitudinal sectional side view showing a fourth example of a conventional fluid substance dispenser.

The configuration shown in U.S. Pat. No. 4,144,988 comprises: as shown in FIG. 5, a cylinder D1; a piston D2 accommodated therein; a threaded shaft D3 fitted through the center of, and mated with, piston D2; and a rotary actuator D4 fitted rotatably at the rear end of the threaded shaft, forming a cylindrical shape. Piston D2 will not rotate with respect to cylinder D1 but can move only in the axial direction. When rotary actuator D4 is rotated to turn threaded shaft D3, piston D2 mated therewith moves back and forth. As the piston moves forwards, a liquid 'a' stored in cylinder D1 is pressed and ejected from an ejection opening D1a.

Of the above conventional dispensers, the dispensers designated as B and C are configured so that the operator directly presses the pressing element forwards so as to eject the fluid substances. Therefore, these configurations have made it difficult to gain a finely adjusted amount of ejection, posing a problem of the operator needing to be skillful to exactly obtain a desired, ejected amount. In particular, in order to eject a highly viscous fluid from an ejection opening having a small diameter, a strong force needs to be applied on the piston. This situation has further made it difficult to make fine adjustment to the pressing element, degrading the work efficiency.

Dispenser A produces substantially the same situation as that of the above B and C, in respect that the pressing element is moved in correspondence with the distance of movement of the lever which is moved approximately linearly, though the pressing element is not directly actuated. Therefore, this configuration also produces the problem of inability of fine adjustment of the ejected amount of the fluid substances. Moreover, since the extruding mechanism of the pressing element is provided with a large lever so as to make the lever control light and since the pressing rod is projected to a large amount rearwards, the dispenser as a whole is bulky, a disadvantage to its carriage.

In contrast, the configuration disclosed in U.S. Pat. No. 4,144,988 makes possible fine adjustment relatively easily since the rotation of the threaded shaft by the rotary actuator is converted into a linear movement of advancement of the piston. However, the dispenser disclosed therein is to distribute a single-component fluid substance. Therefore, when two kinds of fluid substances need to be applied while being mixed, the application should be carried out by holding two dispensers. That is, the task of application has to be carried out whilst two rotary actuators of the dispensers are being handled, leading to a markedly cumbersome work and a high cost.

SUMMARY OF THE INVENTION

The present invention has been devised in view of the problems of the above prior art, and it is therefore an object of the present invention to provide a compact dispenser which is low in price and excellent in its carriage and which enables plural types of fluid substances to be distributed in a finely adjusted amount under simple handling.

In order to achieve the above object, the present invention is configured as follows:

In accordance with the first aspect of the present invention, a fluid substance dispenser, includes:

- a main casing defining a hollow space therein having a plurality of fluid substance storage spaces extending in, and partitioned along, the axial direction thereof;
- a single ejection port arranged in front of the fluid substance storage spaces for allowing the fluid substances to be ejected simultaneously at a predetermined amount; and
- a forward-actuating mechanism for advancing the fluid substances stored in the fluid substance storage spaces toward the ejection port, wherein the forward-actuating mechanism comprises: in each fluid substance storage space, a piston movably fitted therein and having a female threaded hole at a predetermined position and a forward actuation shaft having a male thread mating the female threaded hole, forming a piston moving mechanism which converts rotational movement of the forward actuation shafts into linear movement of the male-female mating position to thereby produce at least a forward-directed thrust force acting on the piston and move the piston at least forwards; and a shaft rotating mechanism for turning the forward actuation shafts, which is composed of a single forward-actuating knob rotatably supported in the main casing and a gear mechanism for transmitting the rotation of the forward-actuating knob to each of the forward actuation shafts.

In accordance with the second aspect of the present invention, a fluid substance dispenser, includes:

a main casing defining a hollow space therein including a plurality of inner sleeves extending in the axial direction thereof, each inner sleeve forming a fluid substance storage space;

a single ejection port arranged in front of the inner sleeves for allowing the fluid substances to be ejected simultaneously at a predetermined amount; and a forward-actuating mechanism for advancing the fluid substances stored in the inner sleeves toward the ejection port, wherein the forward-actuating mechanism comprises: in each inner sleeve, a piston movably fitted therein and having a female threaded hole at a predetermined position and a forward actuation shaft having a male thread mating the female threaded hole, forming a piston moving mechanism which converts rotational movement of the forward actuation shafts into linear movement of the male-female mating position to thereby produce at least a forward-directed thrust force acting on the piston and move the piston at least forwards; and a shaft rotating mechanism for turning the forward actuation shafts, which is composed of a single forward-actuating knob rotatably supported in the main casing, shaft rotating gears, each attached integrally to the rear end of the forward actuation shaft, and a rotary forward actuation gear which rotates integrally with the forward-actuating knob and transmits the rotational force to the shaft rotating gears.

In accordance with the third aspect of the present invention, the fluid substance dispenser having the above second feature is characterized in that the forward-actuating mechanism comprises: in each inner sleeve, a piston movably fitted therein so as to move in the axial direction and so as to be unrotatable while keeping a liquid tight state, and having a female threaded hole and a forward actuation shaft having a male thread mating the female threaded hole; a shaft rotating mechanism for turning the forward actuation shafts, which is composed of a single forward-actuating knob rotatably supported in the main casing and being shiftable in the axial direction, shaft rotating gears, each attached integrally to the rear end of the forward actuation shaft, and a rotary forward actuation gear which is fixed integrally to the forward-actuating knob and can engage with, and disengage from, the shaft rotating gears by the axial shift of the forward-actuating knob.

In accordance with the fourth aspect of the present invention, the fluid substance dispenser having the above first feature is characterized in that inner sleeves are configured so as to be attached to and detached from the main casing and hold the fluid substance therein, and the inner sleeves, the piston and forward actuation shaft are configured to be a cartridge.

In accordance with the fifth aspect of the present invention, the fluid substance dispenser having the above second feature is characterized in that the inner sleeves are configured so as to be attached to and detached from the main casing and hold the fluid substances therein, and the inner sleeves, the pistons and forward actuation shafts are configured to be a cartridge.

In accordance with the sixth aspect of the present invention, the fluid substance dispenser having the above third feature is characterized in that the inner sleeves are configured so as to be attached to and detached from the main casing and hold the fluid substances therein, and the inner sleeves, the pistons and forward actuation shafts are configured to be a cartridge.

In accordance with the seventh aspect of the present invention, the fluid substance dispenser having the above fourth feature is characterized in that a plurality of the inner sleeves are joined integrally.

In accordance with the eighth aspect of the present invention, the fluid substance dispenser having the above fifth feature is characterized in that a plurality of the inner sleeves are joined integrally.

In accordance with the ninth aspect of the present invention, the fluid substance dispenser having the above sixth feature is characterized in that a plurality of the inner sleeves are joined integrally.

In the present invention thus configured, the rotational force, which is actuated by rotating the single forward-actuating knob rotatably supported in the main casing, is transmitted by means of the gear mechanism to each of the forward actuation shafts fitted in the fluid substance storage spaces and rotates them. As a result, the relative position between each forward actuation shaft and the corresponding female threaded portion changes, which urges each piston forwards so that that the pistons eject out the fluid substances stored in the fluid substance storage spaces to the mixing portion at the front side, where the fluid substances are mixed and the fluid mixture is ejected out from the ejection port to the outside.

In this way, in the present invention, the rotation of the forward-actuating knob is converted into linear movement of the pistons, so that it is possible to readily make very fine control, thus providing a stabilized, exact amount of ejection. Further, the operation of only the single forward-actuating knob provides an excellent handling performance and makes it possible to markedly improve the work efficiency of application.

DESCRIPTION OF THE PREFERRED EMBODIMENTS

The embodiment of the invention will hereinafter be described in detail with reference to the accompanying drawings.

Figure 6:
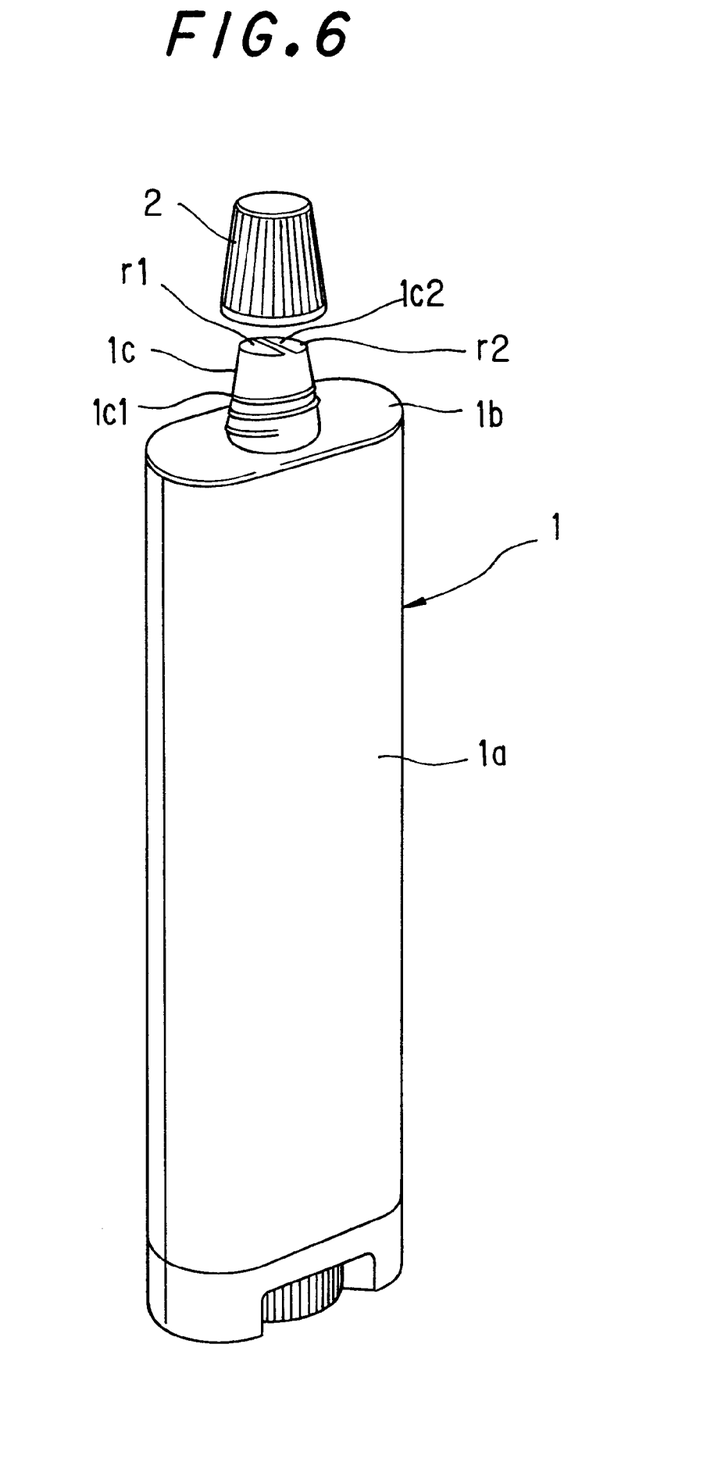
FIG. 6 is a perspective view showing the appearance and configuration of a fluid substance dispenser in accordance with the first embodiment of the invention.
Figure 7:
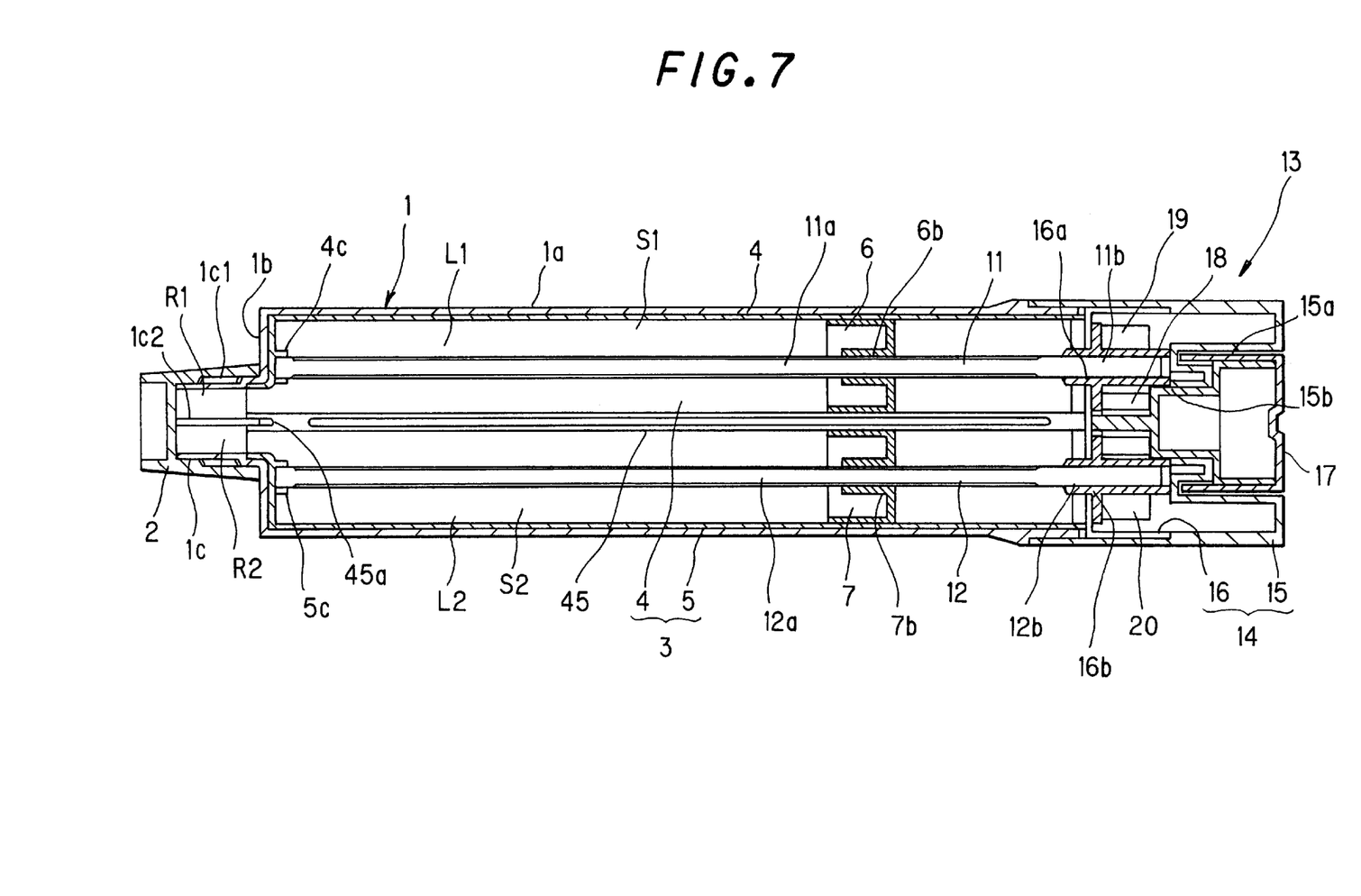
FIG. 7 is a longitudinal sectional side view of that shown in FIG. 6.
Figure 8:
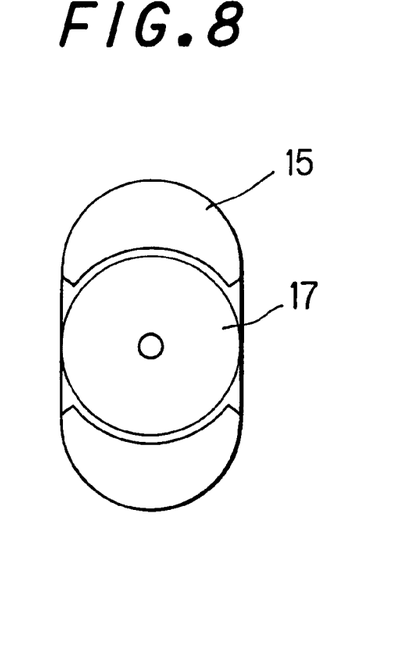
FIG. 8 is a rear-side view of that shown in FIG. 7.
Figure 9:
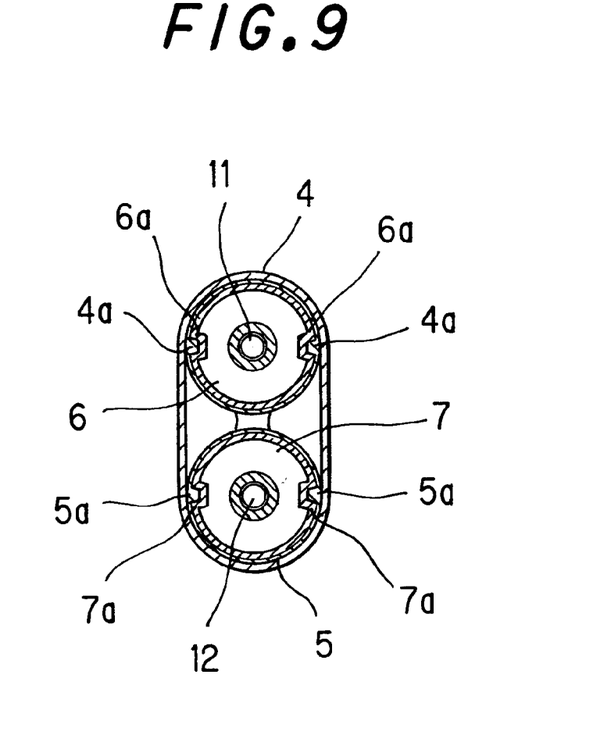
FIG. 9 is a cross-sectional view of that shown in FIG. 7.
Figure 10:
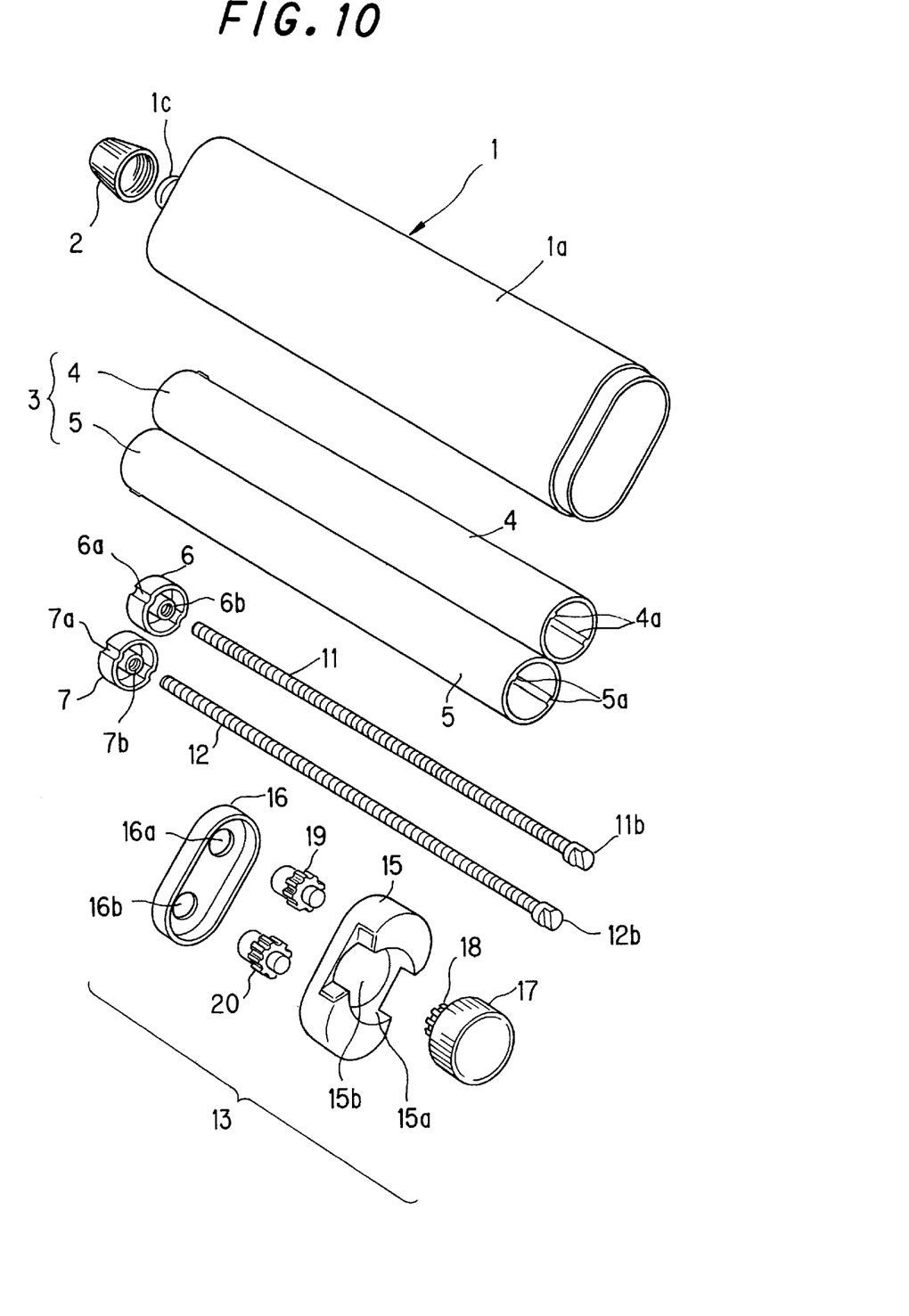
FIG. 10 is an exploded perspective view of that shown in FIG. 6.

FIGS. 6 through 10 are diagrams showing the first embodiment of the present invention. FIG. 6 is a perspective view showing the appearance and configuration of a fluid substance dispenser in accordance with the embodiment of the invention; FIG. 7 is a longitudinal sectional side view of that shown in FIG. 6; FIG. 8 is a rear-side view of that shown in FIG. 7; FIG. 9 is a cross-sectional view of that shown in FIG. 7; and FIG. 10 is an exploded perspective view of that shown in FIG. 6.

The fluid substance dispenser in the first embodiment of the present invention stores and ejects two different types of fluid substances (liquids) and still have a single tubular configuration, viewed externally as shown in FIG. 6.

In this figure, a reference numeral 1 designates a main casing forming a shell of the dispenser. This main casing 1 includes: an ellipsoid part 1a of which the planar sections are ellipses; and a front end face 1b having a head of a hollow truncated ejection tube 1c that projects forwards. Ejection tube 1c has a threaded portion 1c1 formed on its outside periphery so that this threaded portion 1c1 mates with a hollow, truncated cap 2, which covers the front end part of ejection tube 1c. The inner space of this ejection tube 1c is separated by a partitioning plate 1c2 which extends in the axial direction so as to form a pair of ejection channels R1 and R2 of equal open area.

Inserted into main casing 1 through the opening formed at the rear end face is a reservoir 3. This reservoir 3 has an integrated structure composed of a pair of cylindrical, inner sleeves 4 and 5, each having the same curvature as that of the arced internal surface of main casing 1, with a joining portion 45. Therefore, insertion of this reservoir 3 into main casing 1 provides two separated, fluid substance storage spaces (to be referred to, merely, as storage spaces, hereinbelow) S1 and S2 in the inner space of main casing 1. Here, since inner sleeves 4 and 5 are of equal length and diameter, storage spaces S1 and S2 have the same length and diameter. Each inner sleeve 4 and 5 has ribs 4a and 5a extending in the axial direction formed on the inner surface thereof. Formed at the front end of joining portion 45 of reservoir 3 is a slit 45a which fits the rear end of partitioning plate 1c2.

Each inner sleeve 4 and 5 has a cylindrical piston 6 and 7 inserted therein. These pistons 6 and 7 have an outside peripheral surface of almost the same diameter as the inside diameter of inner sleeves 4 and 5 and are formed with engagement grooves 6a and 7a which engage ribs 4a and 5a of the inner sleeves mating with inner sleeves 4 and 5 in a liquid holding state. Therefore, each piston 6 and 7 can move in the axial direction but is prohibited from rotating by engagement of engagement grooves 6a and 7a with ribs 4a and 5a. Pistons 6 and 7 have a threaded hole (female threaded portion) 6b and 7b, at their center, concentrically with their outside peripheral surface. The incised grooves formed in threaded holes 6b and 7b are formed in opposite helical directions from each other.

Arranged in the rear part of main casing 1 is a piston moving mechanism for moving pistons 6 and 7 in respective inner sleeves 4 and 5. This piston moving mechanism comprises: a forward actuation shafts 11 and 12 having male threaded portions 11a and 12a mated with threaded holes 6b and 7b of pistons 6 and 7; and shaft rotating mechanism 13 for turning both forward actuation shafts 11 and 12.

Forward actuation shafts 11 and 12 are rotationally supported at their front end by respective bearings 4c and 5c formed on the inner surfaces at their front end of the inner sleeves while the rear ends are rotationally supported. Here, male threaded portion 11a and 12a on forward actuation shafts 11 and 12 are formed with male threads which go in opposite helical directions from each other, correspondingly to threaded holes 6b and 7b.

Shaft rotating mechanism 13 comprises: a gear cover 14 attached in the rear part of main casing 1; a single forward-actuating knob 17 attached to gear cover 14; and a gear mechanism accommodated in gear cover 14. This gear cover 14 is configured of a cover portion 15 and a bearing portion 16 forming a hollow configuration. The front peripheral-walled portion of cover portion 15 is press-fitted on the outside periphery of the rear part of main casing 1. Formed in the center of cover portion 15 is a depressed portion 15a with a passage hole 15b in the center of depressed portion 15a. The aforementioned, cylindrical forward-actuating knob 17 is fitted rotatably into the depressed portion.

The above gear mechanism comprises: a rotary forward actuation gear 18 which is fixed to the front part of forward-actuating knob 17; and shaft rotating gears 19 and 20 fitting in passage holes 16a and 16b formed in bearing portion 16, meshing with rotary forward actuation gear 18. Shaft rotating gears 19 and 20 each have an irregular passage hole at their center while forward actuation shafts 11 and 12 have at their end respective engaging parts 11b and 12b having irregular sections so that engaging parts 11b and 12b are inserted into the mating holes so as to be detachable and unrotatable.

In the thus configured dispenser, storage spaces S1 and S2 of respective inner sleeves 4 and 5, in front of pistons 6 and 7 are previously filled up with predetermined fluid substances (liquids). Various kinds of fluid substances can be used, typically two fluid substances which need to be mixed right before use are stored in the storage spaces.

Ejecting operation is carried out by gripping main casing 1 and placing the ejection tube 1c at a necessary site, and then turning forward-actuating knob 17 in the predetermined direction.

Illustratively, rotary forward actuation gear 18 rotates together with forward-actuating knob 17 so that shaft rotating gears 19 and 20 meshing gear 18 rotate. Then, shaft rotating gears 19 and 20 rotate in the same directions and forward actuation shafts 11 and 12 rotate together with shaft rotating gears 19 and 20.

Since pistons 6 and 7 mating forward actuation shafts 11 and 12 will not rotate with respect to inner sleeves 4 and 5, the rotation of forward actuation shafts 11 and 12 are converted into linear movement of pistons 6 and 7 so that the pistons move forwards by one pitch of the forward actuation shafts as they make one revolution. Thus, liquids L1 and L2 in storage spaces S1 and S2 are advanced to ejection channels R1 and R2. Liquids L1 and L2 which have been advanced further forwards from ejection channels R1 and R2 are mixed in a mixing space S and then ejected outside.

In this way, in this first embodiment, since the rotation of forward-actuating knob 17 is converted into linear movement of pistons 6 and 7, it is possible to make very fine control thus providing a stabilized, exact amount of ejection. Further, the two kinds of liquid stored in storage spaces S1 and S2 can be advanced simultaneously by actuating only single forward-actuating knob 17, thus attaining excellent operativity and hence leading to a markedly improved work performance.

In this embodiment, reservoir 3 incorporating pistons 6 and 7 and two forward actuation shafts 11 and 12 can be combined into a cartridge so that the fluid substances can be refilled by cartridge.

Illustratively, when the liquids in the cartridge (in inner sleeves 4 and 5) have been completely used up, shaft rotating mechanism 13 is removed from main casing 1 first, then the cartridge as a whole is removed from main casing 1. Thereafter a new cartridge full of liquids is inserted into main casing 1 and then shaft rotating mechanism 13 is re-attached to main casing 1. Here, since shaft rotating gears 19 and 20 can be configured to be fitted in and out with respect to the rear parts of forward actuation shafts 11 and 12, shaft rotating mechanism 13 can be attached and detached easily with respect to the main casing.

In the above first embodiment, as a way of preventing the rotation of pistons 6 and 7 in inner sleeves 4 and 5, ribs 4a and 5a formed on inner sleeves 4 and 5 are adapted to engage with grooves 6a and 7a formed in pistons 6 and 7. However, grooves may be formed in inner shafts 4 and 5 while ribs may be formed on pistons 6 and 7.

Figure 11:
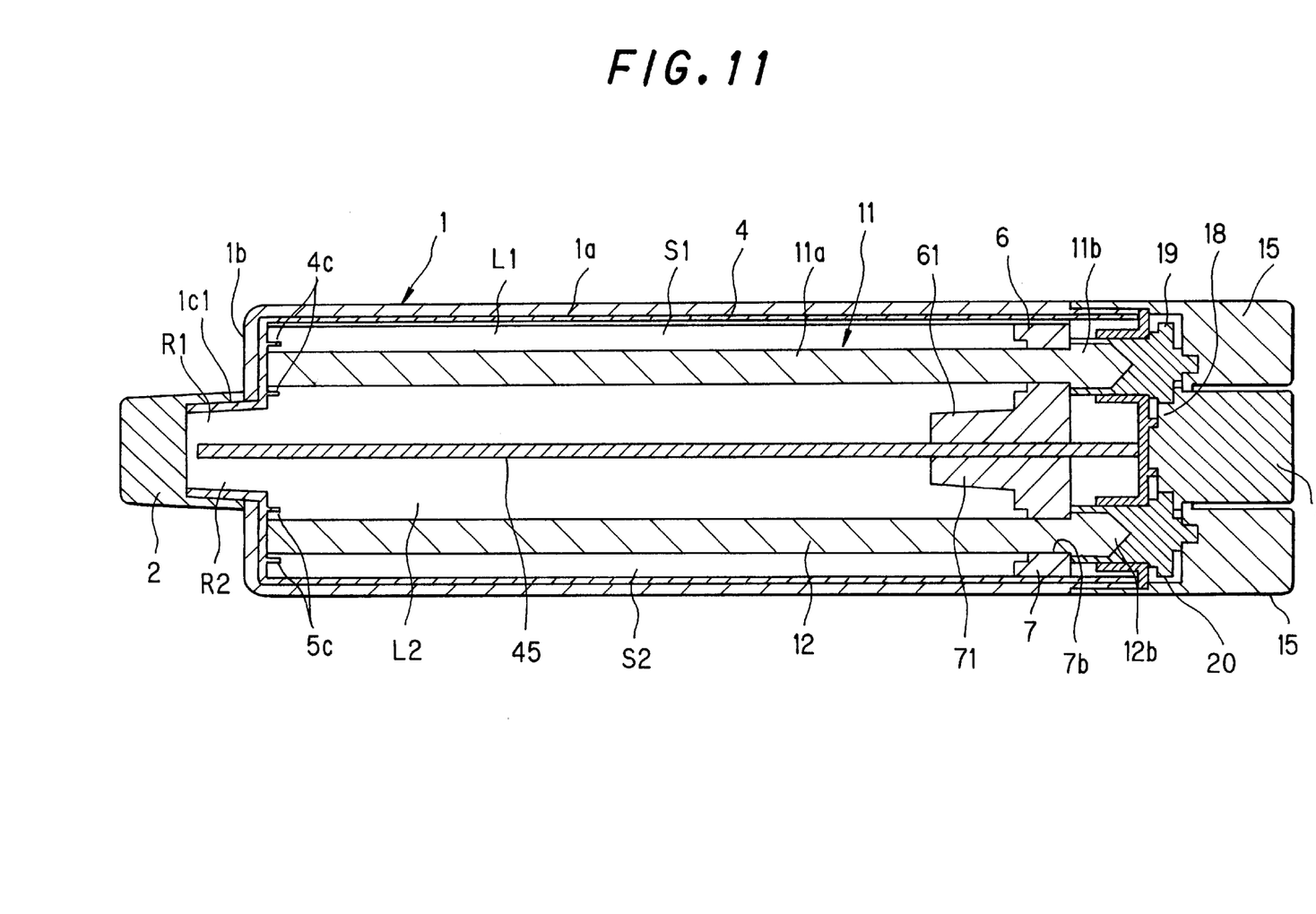
FIG. 11 is a longitudinal sectional side view showing the second embodiment of the invention.
Figure 12:
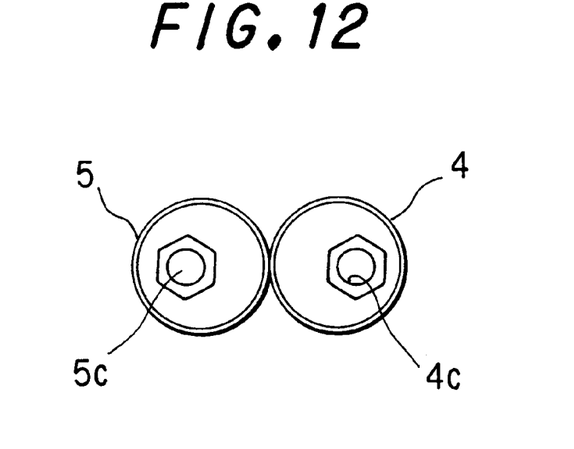
FIG. 12 is a rear-side view showing the shape of the inner sleeves shown in FIG. 11.
Figure 13:
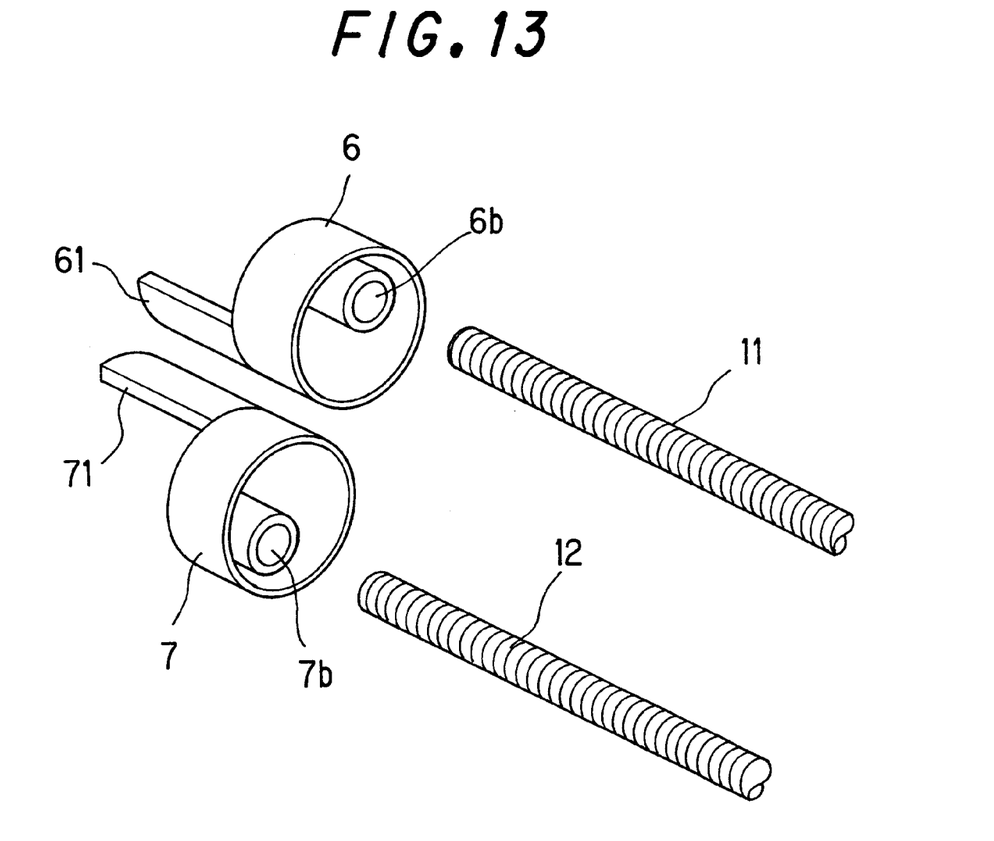
FIG. 13 is a perspective view showing the pistons and forward actuation shafts shown in FIG. 10.

Another way of preventing the rotation of pistons 6 and 7 relative to inner sleeves 4 and 5, it is possible to configure the arrangement of the second embodiment of the present invention, shown in FIGS. 11 through 13, other than the above configuration. In FIGS. 11 through 13, the same or corresponding components are allotted with the same reference numerals for omission from the description.

In the second embodiment, forward actuation shafts 11 and 12 are arranged off the center of pistons 6 and 7 and inner sleeves 4 and 5, so as to prevent pistons 6 and 7 from rotating in inner sleeves 4 and 5, respectively.

Thus, in accordance with the second embodiment, there is no need to provide projection and recess engagement of ribs 4a and 5a and grooves 6a and 7a as in the first embodiment but only need is to produce smooth circular outside peripheral surfaces of the pistons and smooth inner peripheral surfaces of the sleeves. Thus, it is possible to readily secure the liquid holding performance (liquid tight) between inner sleeves 4 and 5 and pistons 6 and 7, respectively. This configuration also makes it possible to simplify forming of pistons 6 and 7 and inner sleeves 4 and 5, which leads to a low-cost configuration.

When mating positions of forward actuation shafts 11 and 12 are set off with respect to the center of pistons 6 and 7, uneven moments may arise in each piston when pistons 6 and 7 move. That is, there is a risk of pistons 6 and 7 being put in skewed contact with the inner surfaces of inner sleeves 4 and 5 while moving, leading to advancement failure.

In order to eliminate such inconveniences, in the second embodiment, each piston 6 and 7 is provided with a circular arced surface 61 and 71 which extend forwards from the part on the circumference of each piston where the maximum moment arises with respect to the threaded hole for the piston, that is, where the distance from forward actuation shaft 11 or 12 becomes maximum, so that the projections will be put into contact with the inner surfaces of inner sleeves 4 and 5 (see FIG. 13). This configuration prevents pistons 6 and 7 from skewing, thus enabling smooth parallel movement of pistons 6 and 7 to smoothly move in parallel. Other than that which is illustrated in the drawing, it is also possible to provide a circular arced surface extending rearwards from the part on the circumference of the piston where the distance from forward actuation shaft 11 or 12 becomes minimum, which provides the same effects.

Further, projected circular arced surfaces 61 and 71 can be formed in a shape identical with ejection channel R1 and R2 so that the liquid can be ejected from storage without any remainder.

The shape of the outer surface of the pistons and of the inner surface of the inner sleeves can be formed of, other than a circle, an ellipse, an oval, a rectangle etc. In these cases, it is possible to prevent the rotation of the piston without the need of providing a special engagement arrangement for the piston's outer surface as well as inner sleeve's inner surface, as in the second embodiment.

Figure 14:
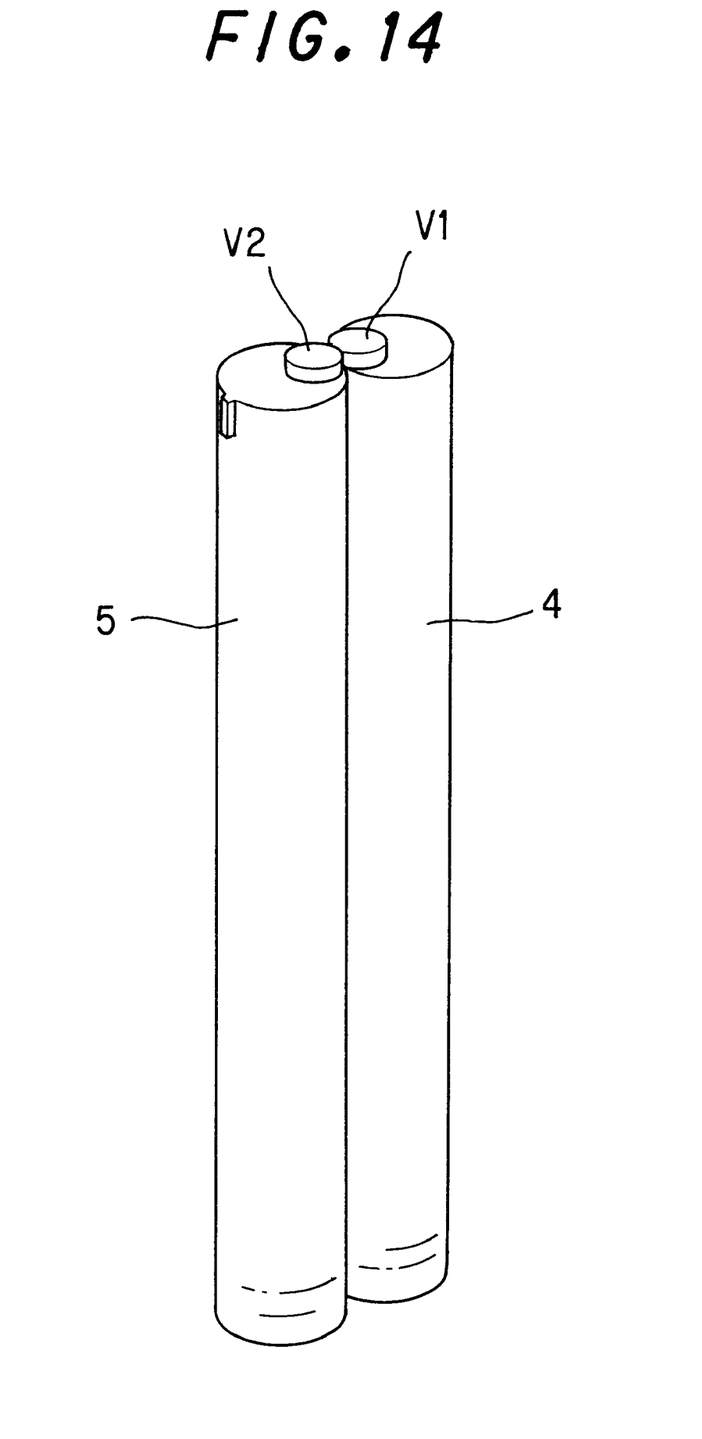
FIG. 14 is a perspective view showing a configuration where valves are provided for the front openings of the inner sleeves.

As shown in FIG. 14, when valves V1 and V2 for confining the front end openings are provided in the inner sleeves of the above embodiments, it is possible to prevent the liquids from flowing out unintentionally even when the openings of the inner sleeves are oriented downward or when the dispenser undergoes a vibration. Accordingly, when two reactive liquid compositions (for example, hairdye, reactive adhesive, filler etc. of two liquid components) are stored in two separated inner sleeves, it is possible to prevent the liquid components from reacting within the inner sleeves due to unintended liquid leakage, enabling applications to various types of liquid.

Though the above first and second embodiments have been referred to as the preferred embodiments of the present invention, the present invention can be modified as appropriate within the technical scope written in the features of the present invention.

For example, in the description of the above embodiments, two kinds of fluid substances are advanced simultaneously, but the present invention will not be limited to the configuration for two kinds of fluid substances. It is possible to apply the present invention to a configuration of three or more kinds of fluid substances by increasing the number of inner sleeves.

Further, in the above embodiments, main casing 1 and ejection tube 1c disposed in the front part of the casing are configured integrally, but a separate ejection tube 1c may be fixed to a main casing 1. Also, cap 2 covering ejection tube 1c may be formed of a simple conduit but it is also possible to fit a resistant element inside the ejection tube so as to mix the ejected liquids from different inner sleeves in an efficient manner. However, since this configuration inevitably needs a longer ejection tube 1c, there is a possibility of the use performance being degraded. In such a case, elements such as resistant elements, producing a mixing function may be arranged within ejection channels R1 and R2.

Moreover, in the description of the above examples, forward-actuating knob 17 and rotary forward actuation gear 18 are formed integrally in order to reduce the cost by using fewer number of parts, parts 17 and 18 may be formed individually and joined together when assembling.

When the engagement between forward-actuating knob 17 and rotary forward actuation gear 18 is configured so as to be engageable with, and disengageable from, each other, it is possible to prevent unintentional rotation of rotary forward actuation gear 18 by detaching forward-actuating knob 17 or by disengaging the engagement between parts 17 and 18 when not in use, thus making it possible to avoid undesired ejection of liquid. As a means for avoiding unwanted ejection of liquid, forward-actuating knob 17 and rotary forward actuation gear 18 may be movable together in the axial direction so that the forward-actuating knob is moved together with rotary forward actuation gear 18 in the axial direction to thereby release meshing with shaft rotating gear 19.

In the above embodiment, the thread pitch of forward actuation shaft 11 may be differed from that of forward actuation shaft 12, to thereby eject different amounts of liquids from inner sleeves 4 and 5.

Ejection tube 1c may be joined to an applicator such as a pen tip, brush etc., so as to facilitate a variety of paintings and applications in the appropreate places.

As has been described heretofore, in accordance with the present invention, the rotational force of a single forward-actuating knob, rotatably supported in the main casing, is transmitted to the forward actuation shafts fitted in the storage spaces of fluid substances so that the rotary movement of each forward actuation shaft is converted into axial movement of the piston arranged within the storage space. Therefore, when a relatively high viscous fluid substance needs to be ejected from a small-diametric ejection opening, it is possible to eject a correct amount of liquid without fluctuations by the rotational operation of the forward-actuating knob, thus facilitating finely adjusted ejection of a very small volume of liquid. Since only a single forward-actuating knob needs to be operated, it is possible even for an unskilled operator to easily perform a proper task of ejection.

What is claimed is:

1. A fluid substance dispenser, comprising:

a main casing defining a hollow space therein having a plurality of fluid substance storage spaces extending in, and partitioned along, the axial direction thereof;

a single ejection port arranged in front of the fluid substance storage spaces for allowing the fluid substances to be ejected simultaneously at a predetermined amount; and a forward-actuating mechanism for advancing the fluid substances stored in the fluid substance storage spaces toward the election port, wherein the forward-actuating mechanism comprises: in each fluid substance storage space, a piston movably fitted therein and having a female threaded hole at a predetermined position and a forward actuation shaft having a male thread mating the female threaded hole, forming a piston moving mechanism which converts rotational movement of the forward actuation shafts into linear movement of the male-female mating position to thereby produce at least a forward-directed thrust force acting on the piston and move the piston at least forwards; and a shaft rotating mechanism for turning the forward actuation shafts, which is composed of a single forward-actuating knob rotatably supported in the main casing and a gear mechanism for transmitting the rotation of the forward-actuating knob to each of the forward actuation shafts.

2. The fluid substance dispenser according to claim 1, wherein inner sleeves are configured so as to be attached to and detached from the main casing and hold the fluid substance therein, and the inner sleeves, the piston and forward actuation shaft are configured to be a cartridge.

3. The fluid substance dispenser according to claim 2, wherein a plurality of the inner sleeves are joined integrally.

4. A fluid substance dispenser, comprising:

a main casing defining a hollow space therein including a plurality of inner sleeves extending in the axial direction thereof, each inner sleeve forming a fluid substance storage space;

a single ejection port arranged in front of the inner sleeves for allowing the fluid substances to be ejected simultaneously at a predetermined amount; and a forward-actuating mechanism for advancing the fluid substances stored in the inner sleeves toward the ejection port, wherein the forward-actuating mechanism comprises: in each inner sleeve, a piston movably fitted therein and having a female threaded hole at a predetermined position and a forward actuation shaft having a male thread mating the female threaded hole, forming a piston moving mechanism which converts rotational movement of the forward actuation shafts into linear movement of the male-female mating position to thereby produce at least a forward-directed thrust force acting on the piston and move the piston at least forwards; and a shaft rotating mechanism for turning the forward actuation shafts, which is composed of a single forward-actuating knob rotatably supported in the main casing, shaft rotating gears, each attached integrally to the rear end of the forward actuation shaft, and a rotary forward actuation gear which rotates integrally with the forward-actuating knob and transmits the rotational force to the shaft rotating gears.

5. The fluid substance dispenser according to claim 4, wherein the forward-actuating mechanism comprises: in each inner sleeve, a piston movably fitted therein so as to move in the axial direction and so as to be unrotatable while keeping a liquid tight state, and having a female threaded hole and a forward actuation shaft having a male thread mating the female threaded hole; a shaft rotating mechanism for turning the forward actuation shafts, which is composed of a single forward-actuating knob rotatably supported in the main casing and being shiftable in the axial direction, shaft rotating gears, each attached integrally to the rear end of the forward actuation shaft, and a rotary forward actuation gear which is fixed integrally to the forward-actuating knob and can engage with, and disengage from, the shaft rotating gears by the axial shift of the forward-actuating knob.

6. The fluid substance dispenser according to claim 5, wherein the inner sleeves are configured so as to be attached to and detached from the main casing and hold the fluid substances therein, and the inner sleeves, the pistons and forward actuation shafts are configured to be a cartridge.

7. The fluid substance dispenser according to claim 6, wherein a plurality of the inner sleeves are joined integrally.

8. The fluid substance dispenser according to claim 4, wherein the inner sleeves are configured so as to be attached to and detached from the main casing and hold the fluid substances therein, and the inner sleeves, the pistons and forward actuation shafts are configured to be a cartridge.

9. The fluid substance dispenser according to claim 8, wherein a plurality of the inner sleeves are joined integrally.

* * * * *